United States Patent [19]

Onanian

[11] Patent Number: 4,979,749
[45] Date of Patent: Dec. 25, 1990

[54] MULTI-USE NUMBER BOARD

[76] Inventor: Richard A. Onanian, 85 Irving St., Arlington, Mass. 02174

[21] Appl. No.: 419,459

[22] Filed: Oct. 10, 1989

[51] Int. Cl.[5] .......................... A63F 3/00; G09B 1/10; G09B 19/02
[52] U.S. Cl. .................................. 273/282; 273/287; 273/288; 434/200; 434/205; 434/83; 434/407; 235/90
[58] Field of Search ........... 273/282 R, 282 C, 282 B, 273/287, 288, 281, 265, 110, 116, 113, 115; 434/200, 204, 205, 259, 83, 407; 235/90

[56] References Cited

U.S. PATENT DOCUMENTS

| | | | |
|---|---|---|---|
| 471,228 | 3/1892 | Rose | 273/115 |
| 818,582 | 4/1906 | Thomas | 273/282 R |
| 1,119,870 | 12/1914 | Pettit | 273/282 C |
| 1,221,493 | 4/1917 | Whitaker | 273/282 C |
| 2,100,421 | 11/1937 | Wupper | 273/282 C |
| 2,984,488 | 5/1961 | Kirchner | 434/83 |
| 3,181,867 | 5/1965 | Dreyer | 273/282 R |
| 3,727,916 | 4/1973 | Miller | 273/281 |

Primary Examiner—Benjamin Layno
Attorney, Agent, or Firm—Joseph S. Iandiorio

[57] ABSTRACT

A multi-use number board including a board having a series of substantially square raised surfaces or lands arranged in rows and columns on the top surface of the board and separated by an array of substantially perpendicular channels, and including holes at the intersections of the channels; the pegs having two ends, both of which may be inserted into the holes, one end being easily removable, the other end forming a friction fit so the peg extends fixedly from the surface of the board.

12 Claims, 4 Drawing Sheets

MULTI-USE NUMBER BOARD

FIELD OF INVENTION

This invention relates to a multi-use number board and more particularly to a number board which has an array of raised surfaces separated by a grid of channels interspersed with holes and special pegs for insertion into the holes.

BACKGROUND OF INVENTION

Previously known number boards suffer from a number of disadvantages. Frequently they are limited in use due to the fact that they are adapted for a single particular application. The surfaces of those boards are not well adapted for accepting written information and do not allow for the easy removal of markings on the surface. Boards which are adapted for written information typically cannot be used for playing games and those boards which may be used for games have flat surfaces which do not accept pegs or place markers. Boards which are adapted to accept pegs typically allow the insertion of the pegs from one side of the board only and do not offer any means for firmly retaining the pins so that the board may be used as a geoboard to exemplify geometric figures. Further, prior art number boards are not well adapted for the use of pegs to represent bar graphs and histograms. Finally, previous number boards have smooth surfaces and therefore are not well suited for use by blind or handicap persons.

SUMMARY OF INVENTION

It is therefore an object of this invention to provide a board which may be used for various alpha-numeric exercises.

It is a further object of this invention to provide a board on which numbers, letters, notations, lines and the like may be drawn and removed.

It is a further object of this invention to provide a board on which selected games may be played.

It is a further object of this invention to provide a board into which pegs may be inserted for use as markers, tokens or movable game pieces.

It is a further object of this invention to provide a board into which pegs may be inserted to exemplify the shape of geometric figures.

It is a further object of this invention to provide a board into which pegs may be inserted for the representation of graphs, such as bar graphs and histograms.

It is a further object of this invention to provide a board into which pegs may be inserted for use as a geoboard.

It is a further object of this invention to provide a board which is well suited to use by blind or handicapped persons.

This invention results from the realization that an improved number board may be achieved by providing a board having an array of raised surfaces with a series of holes in the recesses between the surfaces and pegs which may inserted into the holes from the front or rear of the board to provide movable markers or fixed and stable pegs.

This invention features a multi-use number board having top and bottom surfaces, the top surface including an array of substantially square raised surfaces or lands arranged in rows and columns and separated by an array of substantially perpendicular channels. The board also includes holes located at the intersections of the perpendicular channels.

In a preferred embodiment, the multi-use number board includes a plurality of pegs having two ends, both ends of which are insertable into the holes. One end of each peg is tapered and includes a bead member at the end. The pegs include annular shoulders to limit insertion of the pegs into the holes. The bottom surface of the board includes annular collars around the holes having inner diameters exceeding the diameter of the shoulders on the pegs. The annular collars are of equal height and the shoulders on the pegs are adapted to fall within the annular collars and limit insertion of the tapered ends into the holes from the bottom side of the board while the base portions of the pegs do not exceed the height of the annular feet. In this way, when the pegs are inserted into the board from the bottom side, the annular collars may define a flat plane so that the board may rest on a flat surface.

DISCLOSURE OF PREFERRED EMBODIMENT

Other objects, features and advantages will occur from the following description of a preferred embodiment and the accompanying drawings, in which.

Figure 1:
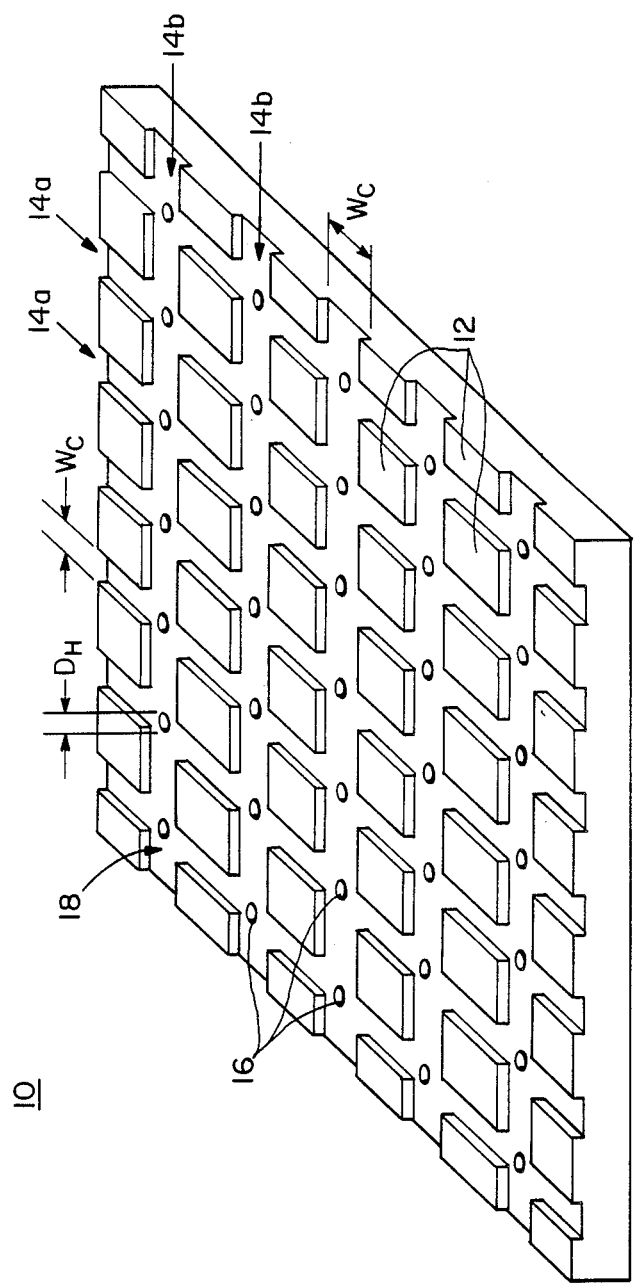
FIG. 1 is a perspective view of the top surface of a board according to this invention.

This invention may be accomplished by a board having an array of substantially square lands arranged in rows and columns on the top surface of a board. The board and the lands may be made of plastic, in which case the board may be formed by injection molding. This allows for a simple mode of manufacture and a convenient way to produce boards in a variety of colors.

The lands are separated by channels between each row and column. The lands may have flat, non-absorbent surfaces to accept markings of erasable writing instruments such as crayons, grease pencils or dry-erase felt tip pens. When used as a number board, for example, to display a multiplication table, each land provides a convenient locator for the proper positioning of the numbers. Lands along the periphery of the board may include indicia of their position or such indicia may be placed in the channels between peripheral lands. Channels between the lands serve to highlight the positioning function. The board includes holes at the intersection of the channels to accept pegs for use as a pegboard or geoboard. Typically, the channels are more narrow than the lands and the diameter of the holes at the intersections of the channels are smaller than the width of the channels. Further, the holes are of uniform diameter throughout the board. The channels serve to guide insertion of the pegs into the holes. This is of particular importance when the board is used as an educational tool for handicapped individuals who may be blind or have coordination difficulty in inserting pegs into holes. Pegs having a variety of colors may be provided to serve as game pieces or to identify various kinds of data when the board is used to present a graph or histogram. Pegs according to this invention have a base and a tapered tip. When inserted in a hole the tapered tip projects outwardly from the top surface of the board. This may be accomplished by inserting the base end of the peg into a hole from the top surface of the board or by inserting the tapered tip through a hole from the bottom surface of the board. When inserted from the top surface, the pegs are easily removable and may therefore be conveniently used as game pieces or movable data markers. When inserted from the bottom side of the board, the wide part of the tapered tip engages in a friction fit with the hole to achieve stable positioning of the peg. Each peg has an annular shoulder separating the base end from the tapered tip, limiting insertion of the peg into a hole when inserted from either side of the board.

The backside of the board may have a surface contour opposite to that of the top surface, i.e., may include an array of substantially squared impressions arranged in rows and columns interspersed with an array of holes. The bottom surface however may also include an annular collar around each hole; the collars establish contact surfaces when the board is placed on a supporting structure such as a table top. The collars have sufficient diameters to allow insertion of the pegs from the bottom side of the board without interference with the annular shoulder on the peg. Therefore, the insertion of pegs from the bottom side of the board does not affect the ability of the board to rest on the underlying table top surface.

Figure 2:
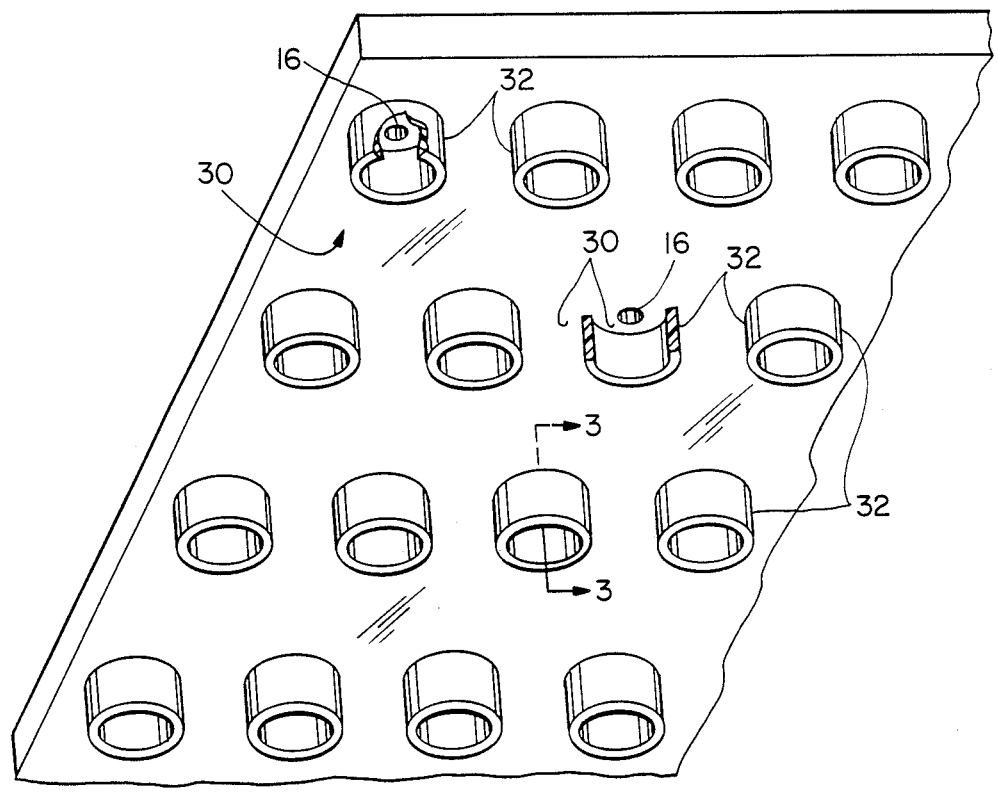
FIG. 2 is a perspective view of the bottom surface of the board of FIG. 1 showing annular collars around the holes, with a partly sectional view of one collar.
Figure 3:
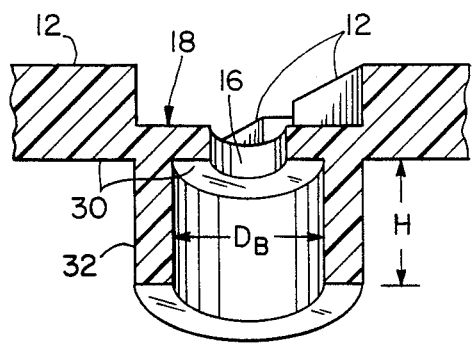
FIG. 3 is an enlarged, partly sectional view of a collar of FIG. 2 taken along line 3—3.

There is shown in FIG. 1, a board 10 according to this invention having a plurality of flat, non-absorbent lands 12 on top surface 18 arranged in rows and columns and separated by an array of substantially perpendicular channels 14a, 14b with holes 16 at the intersections of channels 14. Holes 16 each have a diameter $D_H$ which is less than the width, $W_c$, of the channels. Board 10 includes bottom surface, 30, FIG. 2 having annular annular collars 32 surrounding holes 16. FIG. 3 is a partly sectional, enlarged, perspective view of collar 32 around hole 16 on bottom surface 30. Collar 32 has inner diameter $D_B$ and height H from bottom surface 30.

Figure 4:
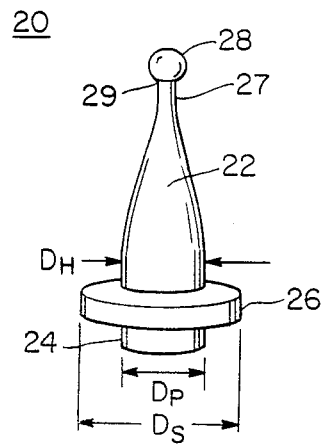
FIG. 4 is a perspective view of a peg according to this invention.

Peg 20, FIG. 4, includes short base portion 24 and annular shoulder 26, which has diameter $D_S$. Base portion 24 has an outer diameter $D_P$ corresponding to the diameter $D_H$ of holes 16. On the other side of shoulder 26 is tapered portion 22 which tapers from its broad point at shoulder 26 toward narrow section 27 near the other end of the peg. The diameter of tapered portion 22 near annular shoulder 26 corresponds in diameter to the diameter of holes 16 so that upon full insertion of tapered portion 22 into hole 16, a friction fit is formed between peg 20 and hole 16. Narrow section 27 is topped with bead 28, forming groove 29 for anchoring strings or elastic bands, as described below.

Figure 5A:
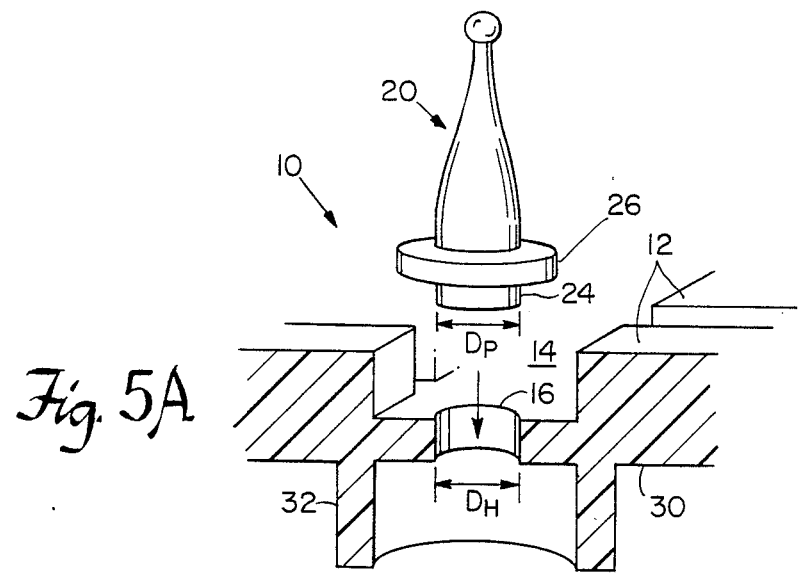
FIG. 5A is a perspective, partly sectional view of the peg of FIG. 4 positioned for insertion into a hole from the topside of the board of FIG. 1.
Figure 5B:
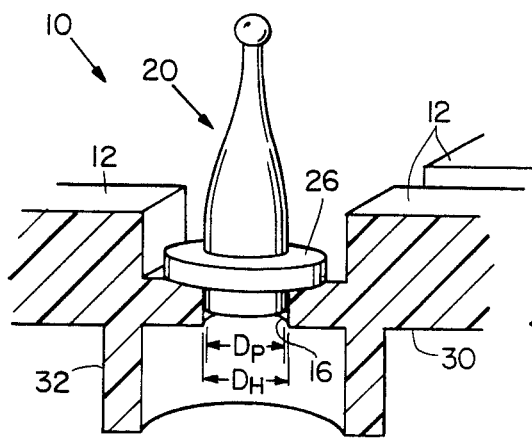
FIG. 5B is a view of the peg of FIG. 5A after insertion.

Peg 20 may be inserted into board 16 from top surface 18 by inserting base portion 24 into hole 16 as shown in FIG. 5A. Shoulder 26 limits the insertion of base 24 into hole 16 as seen in FIG. 5B. Diameter $D_P$ of base portion 24 of pin 20 is only slightly smaller than diameter $D_H$ of hole 16, so that when peg 20 is inserted in hole 16 from top surface 18 of board 10, pin 20 fits snugly but is easily removable and therefore convenient to use as a game piece or data point marker.

Figure 6A:
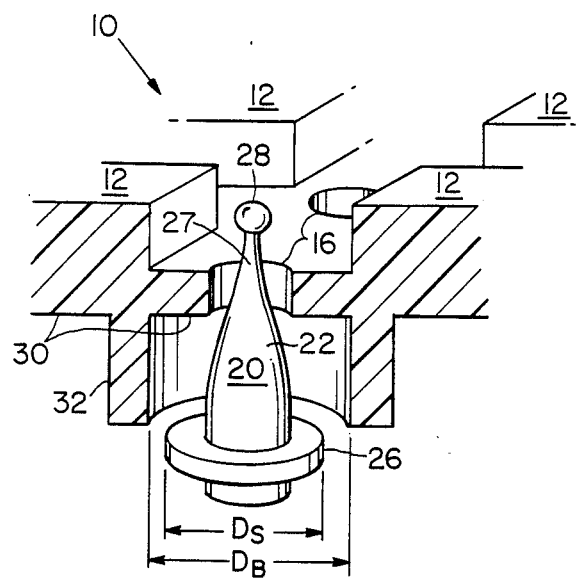
FIG. 6A is a perspective, partly sectional view of the peg of FIG. 4 positioned for insertion into a hole from the bottom side of the board of FIG. 1.
Figure 6B:
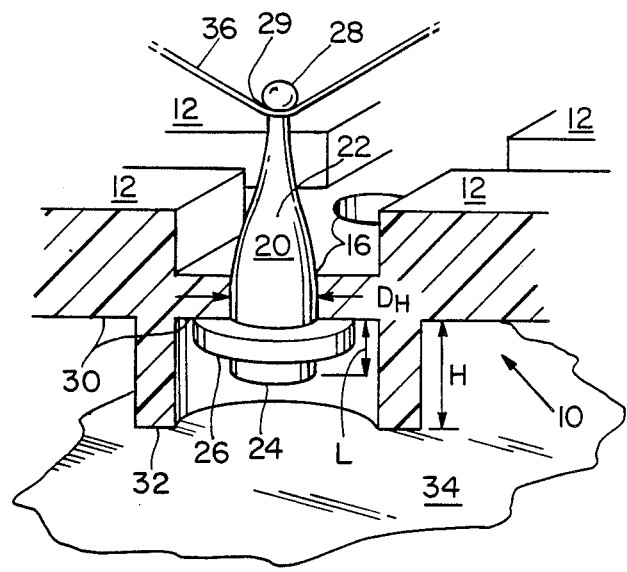
FIG. 6B is a perspective, partly sectional view of the multi-use number board and peg of FIG. 5 after insertion, with a string supported by the peg for use as a geoboard.

Tapered portion 22 of peg 20 may be inserted into hole 16 from bottom surface 30 of board 10, as shown in FIG. 6A. The inner diameter $D_B$ of collar 32 is greater than diameter $D_S$ of annular shoulder 26 so that collar 32 does not inhibit insertion of tapered end 22 into hole 16. Upon insertion, annular shoulder 26 contacts bottom surface 30 and limits the insertion of peg 20 into hole 16. Height H, FIG. 6B, of collar 32 is at least equal to length L of the portion of peg 20 which remains below bottom surface 30 when tapered portion 22 is fully inserted into hole 16 from bottom surface 30. Thus, the contact of collars 32 with underlying surface 34 is not disturbed or changed by the insertion of tapered portion 22 of peg 20 into hole 16 from bottom surface 30. Due to the friction fit between peg 20 and hole 16 when peg 20 is so inserted, peg 20 provides a stable projection from top surface 18 of board 10, from which string or elastic band 36 may be stretched for the formation of various shapes or figures. Thus, the invention may be used as a geoboard. In this use, groove 29, formed by bead portion 28, prevents string or elastic band 36 from slipping off tapered end 22 of peg 20.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A multi-use number board comprising:
   a board having a top and bottom surface, said top surface including a plurality of substantially perpendicular, recessed channels;
   said recessed channels having a substantially flat bottom defining elevated land areas on said top surface;
   said recessed channels containing a plurality of holes located at the intersection of said perpendicular recessed channels; and
   said holes extending through said board, accessible from the top and the bottom of said board.

2. The multi-use number board of claim 1 including a plurality of pegs having first and second ends, said ends insertable into said holes.

3. The multi-use number board of claim 2 wherein each of said first ends includes a tapered portion.

4. The multi-use number board of claim 3 wherein said tapered portions are capped with bead members.

5. The multi-use number board of claim 3 wherein each said first end forms a friction-fit in a said hole when said first end is fully inserted into a said hole.

6. The multi-use number board of claim 2 wherein each of said pegs includes an annular shoulder between said ends to limit insertion into a said hold.

7. The multi-use number board of claim 2 wherein each said second end includes a cylindrical base portion insertable into a said plurality of holes.

8. The multi-use number board of claim 7 wherein each said base portion fits snugly in a said hole when fully inserted into a said hole.

9. The multi-use number board of claim 1 wherein said bottom surface includes annular collars about said holes.

10. The multi-use number board of claim 9 wherein the inner diameter of said annular collar exceeds the diameter of said annular shoulder.

11. The multi-use number board of claim 10 wherein said annular collars are of equal height.

12. The multi-use number board of claim 10 wherein said second end of a said pin is not long enough to protrude beyond said annular collar when said first end is fully inserted into a said hole from the bottom side of said board.

* * * * *